United States Patent
Kusase et al.

(10) Patent No.: US 7,053,508 B2
(45) Date of Patent: May 30, 2006

(54) ROTARY ELECTRIC MACHINE AND A ROTOR OF THE SAME

(75) Inventors: Shin Kusase, Obu (JP); Takeo Maekawa, Okazaki (JP); Toru Onishi, Nisshin (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/851,111

(22) Filed: May 24, 2004

(65) Prior Publication Data
US 2005/0040721 A1 Feb. 24, 2005

(30) Foreign Application Priority Data
May 22, 2003 (JP) .............................. 2003-145293

(51) Int. Cl.
*H02K 9/02* (2006.01)
*H02K 19/22* (2006.01)
*H02K 21/00* (2006.01)

(52) U.S. Cl. .............. 310/64; 310/156.27; 310/156.28; 310/156.31

(58) Field of Classification Search ............ 310/62–64, 310/261, 156, 156.08, 156.27, 156.28, 156.29
See application file for complete search history.

(56) References Cited

U.S. PATENT DOCUMENTS

| 6,144,130 A | * | 11/2000 | Kawamura | ............ | 310/156.28 |
| 6,177,745 B1 | * | 1/2001 | Narita et al. | ........... | 310/156.53 |
| 2002/0180294 A1 | * | 12/2002 | Kaneda et al. | ......... | 310/156.43 |
| 2005/0040721 A1 | * | 2/2005 | Kusase et al. | ......... | 310/156.43 |

FOREIGN PATENT DOCUMENTS

| JP | 11318066 A | * | 11/1999 |
| JP | 2000-278894 | | 6/2000 |
| JP | 2000-197287 | | 7/2000 |

* cited by examiner

*Primary Examiner*—Tran Nguyen
(74) *Attorney, Agent, or Firm*—Oliff & Berridge, PLC

(57) ABSTRACT

In a rotor for a rotary electric machine, a predetermined number of main pole magnets and a predetermined number of yoke magnets are fixed in contact with a hub. Each main pole magnet is magnetized so that its radial inside portion and its radial outside portion have the opposite polarity from each other, of north pole and south pole. Also, each main pole magnet has its radial inside and radial outside polarities reversed from its closest main pole magnets. The yoke magnets are disposed to allow magnetic flux to flow through circumferential surfaces of the main pole magnets. The hub is provided as a heat radiating member and made of metal having high heat conductivity. The hub includes an inner cylindrical portion and an outer cylindrical portion, and forms an air passage spaces.

14 Claims, 4 Drawing Sheets

ROTARY ELECTRIC MACHINE AND A ROTOR OF THE SAME

CROSS REFERENCE TO RELATED APPLICATION

This application is based on Japanese Patent Application No. 2003-145293 filed on May 22, 2003, the disclosure of which is incorporated herein by reference.

FIELD OF THE INVENTION

The present invention relates to a rotary electric machine, which is used in vehicles such as a two wheeler, a car, or a truck and in other general industrial devices, and a rotor of the same.

BACKGROUND OF THE INVENTION

In a Halbach array magnet rotor, a predetermined number of main pole magnets and a predetermined number of yoke magnets are alternately arranged. Each of the main pole magnets is magnetized such that its radial inside portion and its radial outside portion have the opposite polarity from each other, of north pole and south pole. Also, each main pole magnet has its radial inside and radial outside polarities reversed from its closest main pole magnets. The yoke magnets are disposed to allow magnetic flux to flow through interfaces between the main pole magnets and the yoke magnets. The predetermined number is equal to the number of poles. In the Halbach array rotor, the magnetic flux is concentrated at the poles. Further, a yoke is not required. Therefore, this rotor can provide a compact, light weight, high performance rotary electric machine. As an example of this kind of rotary electric machine, it is known a light weight motor having a resinous rotor in which the main pole magnets and the yoke magnets are housed in a resinous hub, without requiring the yoke. This rotary electric machine is for example proposed in Unexamined Japanese Patent Publication No. JP-A-2000-197287.

However, the Halbach array rotor has following disadvantages.

First, because the main pole magnets and the yoke magnets are opposed to one another, the magnets cause demagnetization between them. As a result, they are likely to cause self-demagnetization. In a case of motor, it is difficult to supply a large amount of current. That is, load tolerance of the motor is low. Also, in a case of a generator, the rotor is affected by armature reaction. Therefore, if magnetic characteristic is reduced under a high temperature condition, the magnets are likely to be irreversibly demagnetized. Accordingly, the rotor is easily affected by heat. It is difficult to provide a high performance rotor with a compact body.

Next, because the main pole magnets and yoke magnets repel to one another with high forces, gaps are easily formed between the magnets. As a result, it is difficult to maintain rotation balance and to restore the balance in the rotor.

Further, the main pole magnets and the yoke magnets are arranged such that the same polarities are opposed at the radial outer portions, resulting the demagnetization. If the force of yoke magnets is too strong, the main pole magnets will be easily demagnetized. On the other hand, if the force of main pole magnets is too strong, the yoke magnets will be easily demagnetized. Especially in the generator in which the position of reaction field is not controlled, the armature reaction currents apply opposing magnetic fields to the magnets at many positions. Therefore, it is difficult to reduce the demagnetization.

Also, in the Halbach array rotor, the magnets having high magnetic flux density and providing a magnetic circuit are arranged throughout the outer periphery of the rotor. Accordingly, the costs is increased while the performance is improved.

Furthermore, because the main pole magnets in which the magnetic flux is concentrated is made of magnetic materials, it is difficult to provide locally high magnetic flux density as in core poles. Therefore, even in the Halbach array having the high concentration of magnetic flux, it is difficult to increase the total amount of magnetic flux linking to a stator.

SUMMARY OF THE INVENTION

The present invention in made in view of the foregoing matters, and it is an object of the present invention to provide a rotary electric machine and a rotor of the rotary electric machine, capable of reducing thermal demagnetization when used in a generator which is easily affected by opposing magnetic field at many positions under a high temperature condition.

It in another object of the present invention to provide a rotary electric machine, capable of maintaining balance, and a rotor of the same.

It is further another object of the present invention to provide a rotor and a rotary electric machine having the rotor, capable of improving reliability, and a rotor of the same.

It is yet another object of the present invention to provide a rotary electric machine, capable of reducing costs of magnets, and a rotor of the same.

It is still another object of the present invention to provide a rotary electric machine, capable of increasing effective magnetic flux, and a rotor of the same.

According to a first aspect of the present invention, a rotor for a rotary electric machine has a predetermined number of main pole magnets, a predetermined number of yoke magnets, and a metal heat radiating member having high heat conductivity. Each of the main pole magnets is magnetized so that its radial inside portion and its radial outside portion have the opposite polarity from each other, of north pole and south pole. Also, the main pole magnets are arranged in a circumferential direction so that each main pole magnet has its radial inside and radial outside polarities reversed from its closest main pole magnets. The yoke magnets are disposed to allow magnetic flux to flow through interfaces between the yoke magnets and main pole magnets. Further, the main pole magnets and the yoke magnets are fixed in contact with the heat radiating member. The predetermined number is equal to the number of poles.

Accordingly, temperature of the main pole magnets and yoke magnets is decreased through the heat radiating member. Therefore, thermal demagnetization of the magnets, that is, characteristic deterioration of the magnets due to temperature increase is restricted. Thus, reliability of the rotor under a high temperature condition is improved.

According to a second aspect of the present invention, a rotor has a predetermined number of main pole magnets and a predetermined number of yoke magnets Each of the main pole magnets is magnetized so that its radial inside portion and its radial outside portion have the opposite polarity from each other, of north pole and south pole. Also, the main pole magnets are arranged so that each main pole magnet has its radial inside and radial outside polarities reversed from its closest main pole magnets. The yoke magnets are disposed to allow magnetic flux to flow through circumferential surfaces of the main pole magnets, which abut on the circumferential surfaces of the yoke magnets. Further, each main pole magnet has a shape such that its circumferential dimension is increased in a radial outward direction.

Since the main pole magnet has a substantially fan shaped cross-section, the magnetic flux flowing from the yoke magnets is not disturbed. Accordingly, the amount of magnetic flux is increased in the predetermined number of magnets. Further, power output is improved while restricting an increase in costs.

According to a third aspect of the present invention, in a rotor having a predetermined number of main pole magnets and a predetermined number of yoke magnets, an arc ratio of each main pole magnet to each yoke magnet with respect to a circumferential direction is two to one. Accordingly, the magnetic flux merged through the yoke magnet is substantially equal to the magnetic flux of the main pole magnet. Therefore, the magnetic flux is increased in the predetermined number of magnets use.

According to a fourth aspect of the present invention, a rotor has a predetermined number of main pole magnets, core pole pieces, a predetermined number of yoke magnets. Each main pole magnet is magnetized so that its radial inside portion and its radial outside portion have the opposite polarity from each other, of north pole and south pole. Also, the main pole magnets are arranged in a circumferential direction so that each main pole magnet has its radial inside and radial outside polarities reversed from its closest main pole magnets. The core pole pieces have thermal conductivity and are arranged on the radial outside of the main pole magnets. The yoke magnets are disposed to allow magnetic flux to flow through circumferential surfaces of the main pole magnets.

Accordingly, a large amount of magnetic flux is concentrated in the core pole pieces, thereby improving power output. A compact, light weight, high cost performance rotor is provided. Further, because each core pole piece is in contact with the main pole magnet and the yoke magnet, the heat of the main pole magnet and yoke magnet is easily transferred to the core pole piece. Therefore, characteristic deterioration of the magnets under a high temperature condition is restricted.

According to a fifth aspect of the present invention, a rotary electric machine has a distributed winding-type stator and a rotor including a predetermined number of main pole magnets and a predetermined number of yoke magnets. The stator is disposed to oppose the rotor on a radial outside of the rotor. Each main pole magnet is magnetized so that its radial inside portion and its radial outside portion have the opposite polarity from each other, of north pole and south pole. Also, the main pole magnets are arranged in a circumferential direction so that each main pole magnet has its radial inside and radial outside polarities reversed from its closest main pole magnets. The yoke magnets are disposed to allow magnetic flux to flow through interfaces between the yoke magnets and main pole magnets.

In the distributed winding-type starter, demagnetization occurs less than a concentrated winding-type stator in which windings are wound many times to maintain a sufficient electro motive force, so a large armature reaction is generated when an armature current occurs. Therefore, in the Halbach array rotor, which requires a consideration of demagnetization, reliability to the demagnetization is improved. In the concentrated winding-type stator, the amount of magnetic flux of permanent magnets (main pole magnets) is limited. Thus, the magnetic flux has difficulty to enter a stator core (laminated core) through narrow teeth, so effective magnetic flux is limited. In the distributed winding-type stator, on the other hand, the magnetic flux of the main pole magnets can enter the stator through the teeth. Therefore, the amount of effective magnetic flux is increased.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
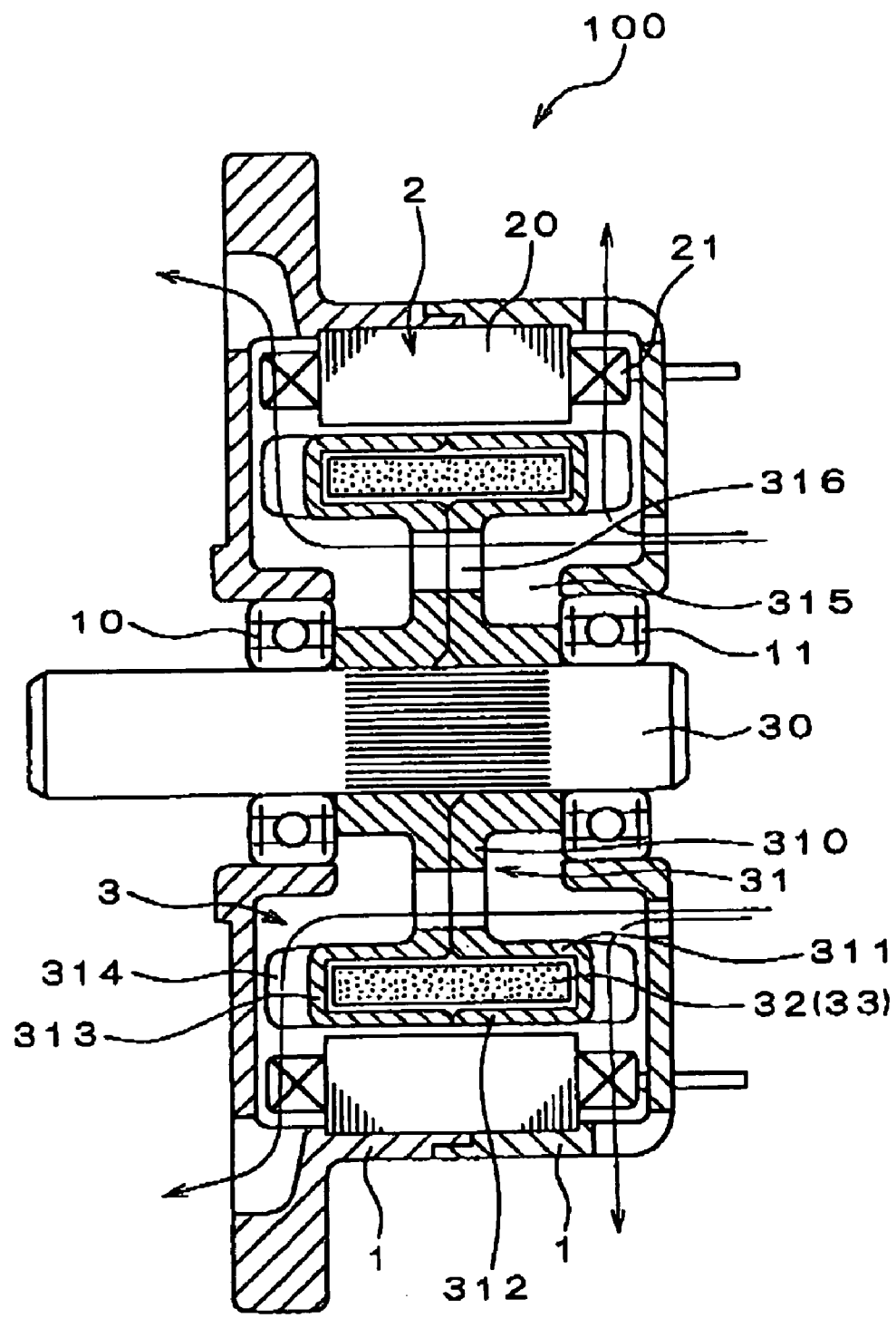
FIG. 1 is a schematic cross-sectional view of a vehicle ac generator according to a first embodiment of the present invention.

Embodiments of the present invention will be described hereinafter with reference to the drawing.

First Embodiment

Figure 2:
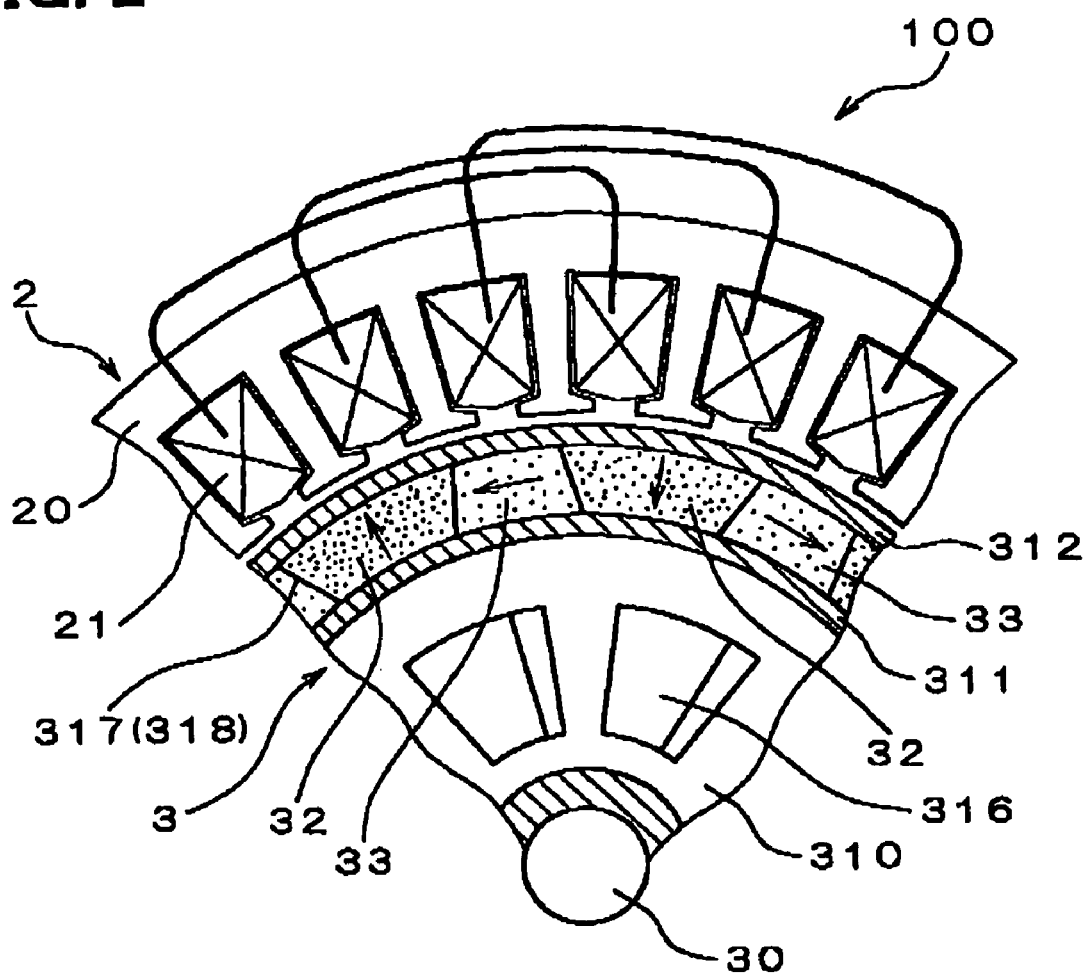
FIG. 2 is a partial enlarged cross-sectional view of the vehicle ac generator, taken in a radial direction, according to the first embodiment of the present invention.
Figure 3:
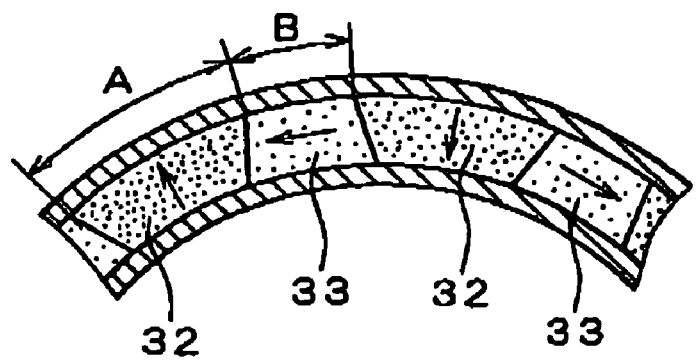
FIG. 3 is a partial enlarged cross-sectional view of a rotor of the vehicle ac generator according to the first embodiment of the present invention.

Referring to FIGS. 1 to 3, the present invention is for example employed to a vehicle ac generator 100. As shown in FIG. 1, the vehicle ac generator 100 includes a frame 1, a stator 2, and a rotor 3.

The stator 2 includes a core 20 made of a stack of core plates and a three-phase armature winding 21. The core 20 forms a plurality of teeth along its circumference, as shown in FIG. 2. The winding 21 is wound in each of slots defined between the teeth of the core 20. Furthermore, the winding 21 is wound in the slots in a pitch of 180° electrical angle so that three teeth are included in one pole pitch (180° electrical angle). The core 20 is housed and fixed to the frames 1 in a condition that an outer peripheral surface of the core 20 is cramped by an inner peripheral surface of the frame 1.

The rotor 3 is rotated to produce a rotating magnetic field linking to the stator 2. The rotor 3 is constructed of a rotation shaft 30, a hub 31, a predetermined number of main pole magnets 32, and a predetermined number of yoke magnets 33. A pair of bearings 10, 11 are fixed in the frame 1. The rotation shaft 30 is rotatably supported through the bearings 10, 11. Further, the rotation shaft 30 is connected to a generator pulley (not shown), which is rotated through a crank pulley of an engine.

The rotation shaft 30 is partly provided with a knurled portion on its outer peripheral surface. The hub 31 is provided as a non-magnetic metal heat radiating portion having high heat conductivity and is made of duralumin. The hub 31 is engaged around the knurled portion of the rotation shaft 30. The hub 31 includes a radial extending portion 310, an inner cylindrical portion 311, an outer cylindrical portion 312, base portions 313 and heat radiating portions 314, which are in form of blades.

The radial extending portion 310 extends in a radial outward direction from a substantially middle portion of the engaging surface of the hub 30. The inner cylindrical portion 311 has a substantially cylindrical shape and is located radially outside of the radial extending portion 310. The inner cylindrical portion 311 extends in an axial direction (to the right and left in FIG. 1) of the rotation shaft 30 from a radial outer end of the radial extending portion 310. The axial ends of the inner cylindrical portion 311 further extends in the radial outward direction and continues to the outer cylindrical portion 312. The outer cylindrical portion 312 extends in the axial direction and merges with its axially middle position. Further, the merging ends of the outer cylindrical portion 312 are joined at the axially middle position by welding, thereby defining an enclosed space between the inner cylindrical portion 311 and the outer cylindrical portion 312.

In the enclosed space between the inner cylindrical portion 311 and the outer cylindrical portions 312, the predetermined number of main pole magnets 32 and the predetermined number of yoke magnets 33 are arranged alternately in the circumferential direction, as shown in FIG. 2. Here, the predetermined number is equal to the number of poles. The yoke magnets 33 are disposed to allow magnetic flux to flow through circumferential surfaces of each main pole magnets 32, that is, through interfaces between the main pole magnets 32 and the yoke magnets 33.

As shown in FIG. 2, each of the main pole magnets 32 is magnetized so that its radial inside portion and its radial outside portion have the opposite polarity from each other, of north pole and south pole. That is, one portion is north while the other is south. Further, the main pole magnets 32 are arranged such that the radial magnetizing direction is reversed alternately in the circumferential direction. That is, the main pole magnets 32 are arranged in the circumferential direction so that each main pole magnet 32 has its radial inside and radial outside polarities reversed from its closest main pole magnets when one main pole magnet 32 is magnetized such that its radial outside portion has north pole, neighboring main pole magnets 32 are magnetized such that those radial outside portions have south poles.

Each of the yoke magnets 33 is magnetized such that its circumferential sides, which abut different main pole magnets, have different polarities from each other. Furthermore, the yoke magnet 33 is magnetized such that the side opposed to the main pole magnet 32 that is magnetized such that the radial outside portion has north pole has north pole and the side opposed to the main pole magnet 32 that is magnetized such that its radial outside portion has south pole has south pole. The main pole magnets 32 and the yoke magnets 33 are formed of rare earth neodymium boron permanent magnets.

Accordingly, the rotor 3 is constructed of the main pole magnets 32, the yoke magnets 33, the inner and outer cylindrical portions 311, 312 located on the inner and outer peripheries of the magnets 32, 33 and made of duralumin. Namely, the rotor 3 does not include a core, which is a magnetic material. For example, a thickness of the inner cylindrical portion 311 is 5.0 mm, and a thickness of the outer cylindrical portion 312 is 0.8 mm.

The heat radiating portions 314, which are in the form of blades extending from the base portions 313 are provided at the axial ends of the inner cylindrical portion 311 and the outer cylindrical portion 312. The blade-shaped heat radiating portions 314 and the base portions 313 restrict the main pole magnets 32 and the yoke magnets 33 from displacing or moving in the axial direction due to their reaction forces. Further, a hollow space 315 is formed on an inner peripheral side of the inner cylindrical portion 311. The radial extending portion 310 is formed with air holes 316 communicating with the hollow space 315.

As shown in FIGS. 2 and 3, the main pole magnet 32 has a first arc length A on its outer circumference opposed to the teeth of the core 20. The yoke magnet 33 has a second arc length B on its outer circumference opposed to the teeth of the core 20. An arc ratio of the first arc length A to the second arc length B is two to one.

Each main pole magnet 32 has a cross-sectional shape in which a width (length) with respect to the circumferential direction is increased in the radial outward direction. On the other hand, each yoke magnet 33 has a cross-sectional shape in which a width (length) with respect to the circumferential direction is increased in a radial inward direction. The main pole magnets 32 and the yoke magnets 33 are housed and fixed between the inner cylindrical portion 311 and the outer cylindrical portion 312 in a condition that gaps 317 are defined between the main pole magnets 32 and the yoke magnets 33 and between the magnets 32, 33 and the peripheral members such as the inner cylindrical portion 311 and the outer cylindrical portion 312. The gaps 317 are created by such as reaction forces of the magnets 32, 33. In the embodiment, the gaps 317 are filled with fixing agent 318 having heat conductivity. Thus, the movement of the main pole magnets 32 and the yoke magnets 33 are restricted one another by wedge effects. Also, the magnets 32, 33 are bonded by the fixing agent 318.

Figure 4:
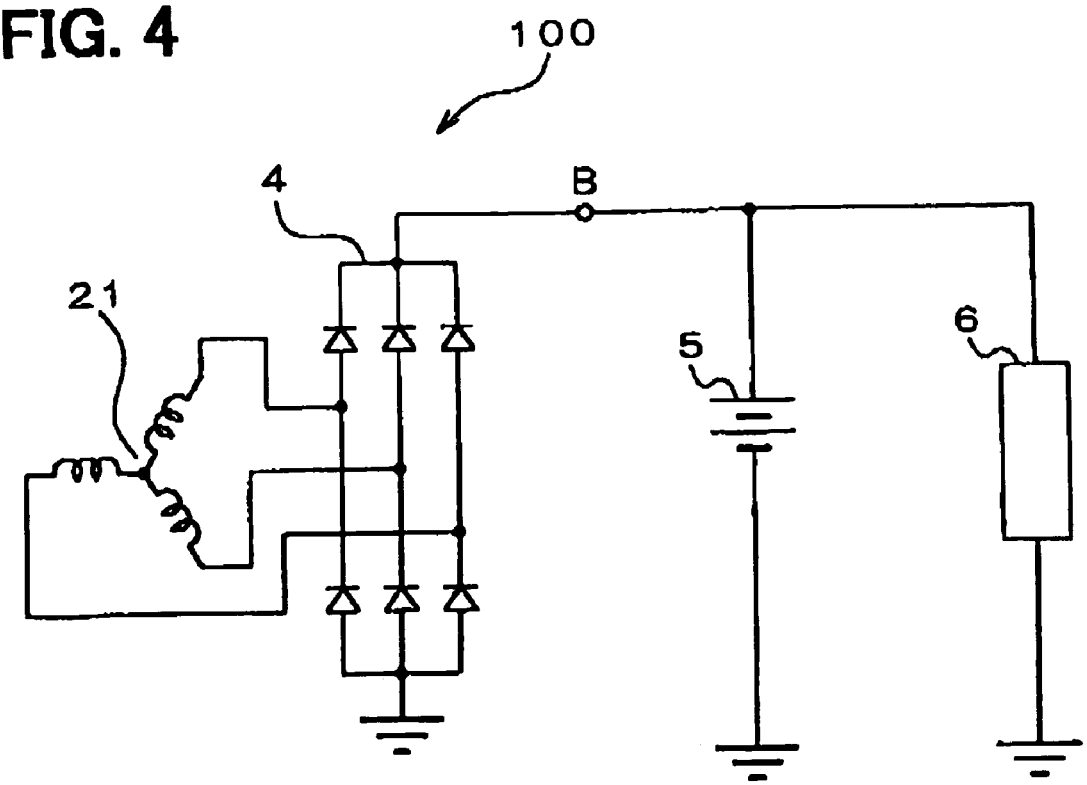
FIG. 4 is a circuit diagram of the vehicle ac generator according to the first embodiment of the present invention.

As shown in FIG. 4, the armature winding 21 is constructed of a three-phase distributed winding and has a Y connection. Three output terminals of the winding 21 are connected to a three-phase rectifier 4. An output terminal (B terminal) of the rectifier 4 is connected to a battery 5 mounted on a vehicle and various electrical loads including various lamps.

Next, operation of the vehicle ac generator 100 will be described.

Because the yoke magnets 33 abut the main pole magnets 32 in the circumferential direction, magnetmotive forces of the main pole magnets 32 and the yoke magnets 33 are composed, and magnetic flux is supplied to the core 20 of the stator 2 through the magnets 32, 33 as magnetic flux paths. That is, a core as a yoke is not required. When the rotation shaft 30 is rotated in a condition that the magnetic flux supplied in the above manner is linked to the stator 2, north pole and south pole are alternated. Thus, electro motive force is produced in the stator 2 on which the armature winding 21 is wound. This electro motive force is rectified in the rectifier 4 and is supplied to the battery 5 and the electrical loads 6.

When the electric current is produced in the stator 2 in the above manner, heat is generated due to Joule loss. So, the heat is transferred from the armature winding 21 to the core 20. Also, hysteresis loss and eddy current loss occur in the core 20 by alternating flux linkage of the stator 2, so the core 20 is similarly heated. The heat of the core 20 is transferred to the main pole magnets 32 and the yoke magnets 33, which are opposed to the stator 2, by beat transmission and heat radiation. As a result, temperature of the main pole magnets 32 and the yoke magnets 33 are increased.

Further, the main pole magnets 32 and the yoke magnets 33 are magnetized such that those polarities are opposed to each other at their respective radial half portions. Also, in the vehicle ac generator 100, the armature reaction force due to armature current as a reaction force of field magnetization, that is, a diamagnetic field is created. Therefore, the main pole magnets 32 and the yoke magnets 33 are located under a condition easily demagnetized under this condition, when the temperature is increased due to the heat from the stator 2, the demagnetization characteristic of these magnets 32, 33, that is, BH characteristic, is close to an origin. If the characteristic is largely deteriorated, the magnets 32, 33 are likely to be permanently demagnetized. In the structure of the embodiment, however, the heat radiating member for cooling the main pole magnets 32 and the yoke magnets 33 is constructed of the hub 31. Further, the hub 31 is located in contact with the main pole magnets 32 and the yoke magnets 33. Therefore, the temperature of the magnets 32, 33 are reduced. Accordingly, the permanent demagnetization of the magnets 32, 33 due to the deterioration of characteristic is restricted.

Also, the hollow space 315 is formed between the rotation shaft 30 holding the hub 31 and the inner cylindrical portion 311 of the duralumin hub 31, which is an excellent heat conductive metal member, thereby forming air passage spaces. Therefore, the temperature of the main pole magnets 32 and the yoke magnets 33 is sufficiently reduced by a heat absorbing effect of the hub 31 because the hub 31 is cooled by air passing through the air passage spaces. Accordingly, the deterioration of the characteristic of the magnets 32, 33 is restricted.

In addition, the outer peripheries of the main pole magnets 32 and the yoke magnets 33 are surrounded and restricted by the outer cylindrical portion 312. The temperature of the main pole magnets 32 and the yoke magnets 33 is largely reduced by a heat absorbing effect of the outer cylindrical portion 312. Therefore, the deterioration of characteristic of the magnets 32, 33 is restricted. Furthermore, gaps are unlikely to be created between the magnets 32, 33 due to reaction force or during the rotation. Accordingly, it is less likely that the rotor 3 will lose its rotation balance.

The duralumin base portions 313 and blade-shaped heat sink portions 314 are provided at the axial ends of the main pole magnets 32 and the yoke magnets 33 to restrict axial movements of the main pole magnets 32 and the yoke magnets 33. The temperature of the main pole magnets 32 and the yoke magnets 33 is largely reduced by heat absorbing effects of the base portions 313 and the heat sink portions 314. Thus, the deterioration of characteristic of the magnets 32, 33 is restricted. Also, gaps are unlikely to be created between the magnets 32, 33 due to the reaction force or during the rotation. Therefore, the rotor 3 can maintain its rotation balance.

The heat conductive fixing agent 318, which has heat conductivity higher than that of air, is filled in the gaps 317 between the main pole magnets 32 and the yoke magnets 33 and gaps between the magnets 32, 33 and the peripheral members through the fixing agent 318. Therefore, the heat of the main pole magnets 32 and the yoke magnets 33 is easily transferred to the peripheral members. Since the temperature of the magnets 32, 33 is largely reduced, the deterioration of characteristic of the magnets 32, 33 is restricted. In addition, the axial displacement of the magnets 32, 33 during the rotation is restricted and the gaps around the magnets 32, 33 due to the reaction forces are unlikely to be created. Therefore, the rotor 3 maintains its rotation torque balance.

Each of the main pole magnets 32 has a trapezoidal-shaped or fan-shaped cross-section in which the circumferential dimension is increased in the radial outward direction. The magnetic flux of the yoke magnet. 33 flows through the circumferential surfaces of the main pole magnets 32 although the main pole magnets 32 is magnetized in the radial direction. The circumferential dimension of the main pole magnet 32 is gradually increased to the radial outward direction. Therefore, the merged magnetic flux is not disturbed by the magnetization of the main pole magnets 32. As a result, the flow of the magnetic flux is facilitated. Accordingly, the more amount of magnetic flux is allowed to flow in the predetermined number of magnets. Further, power output is increased in the compact vehicle ac generator 100.

The arc ratio of the main pole magnet 32 to the yoke magnet 33 is substantially two to one. Therefore, the magnetic flux merged through the circumferential surfaces of the main pole magnet 32 has a flux density substantially the same as that of the main pole magnet 32. Therefore, the magnetic flux is increased in the predetermined number of magnets.

In a concentrated winding type armature winding, generally, the winding number of the winding is increased to increase an electro motive force. When the armature current passes in the armature winding, a large armature reaction force is generated. As a result, demagnetization largely occurs. In the vehicle ac generator 100 of the embodiment, however, the stator 2 has the distributed winding type armature winding 21. The armature winding 21 is opposed to the rotor 3 having the Halbach array, which requires a consideration of the demagnetization. Because large demagnetization does not occur in the distributed winding type armature winding 21 as in the concentrated winding type armature winding, reliability to the demagnetization is increased in the Halbach array rotor 3. Further, in the concentrated winding type armature winding, the magnetic flux density of the permanent magnets is limited. Therefore, it has difficulty to allow the magnetic flux to flow in the narrow teeth of the core. So, the amount of effective magnetic flux is limited. On the other hand, in the distributed winding type armature winding 21, the magnetic flux of the main pole magnets 32 can enter the stator 2 through the teeth of the core 20. Therefore, the total amount of the effective magnetic flux is increased.

The main pole magnets 32 and the yoke magnets 33 are arranged such that an outside diameter of the main pole magnets 32 is the same as an outside diameter of the yoke pole magnets 33. The outer circumferences of the main pole magnets 32 and the yoke pole magnets 33 are entirely used as poles. Because the magnetic flux can enter the plurality of teeth of the core 20 from both the main pole magnets 32 and the yoke magnets 33 that are located within the range of 180° electrical angle. Therefore, the amount of effective magnetic flux is further increased.

Accordingly, objects, such as the decrease in the thermal demagnetization of the magnets in the generator in which a temperature is high and the opposing magnetic field is easily applied to various positions, maintaining balance, maintaining reliability, reducing costs of magnets, increasing total effective magnetic flux, are achieved. Therefore, the compact, light weight, high performance vehicle ac generator 100 can be provided.

In a conventional vehicle ac generator in a class of 14V, 150 A, an outside diameter of the stator is 128 mm and a weight is 5 kg. By employing the structure of the embodiment in the vehicle ac generator, the outside diameter of the stator 2 is 100 mm and the weight is 3 kg. Accordingly, the size and weight of the vehicle ac generator is reduced.

Second Embodiment

In the second embodiment, general structure of the vehicle ac generator is similar to that of the first embodiment shown in FIG. 1. The vehicle ac generator of the second embodiment has a rotor 3A, which is different from the rotor 3 of the first embodiment. Thus, a description will be mainly made about the rotor 3A.

Figure 5:
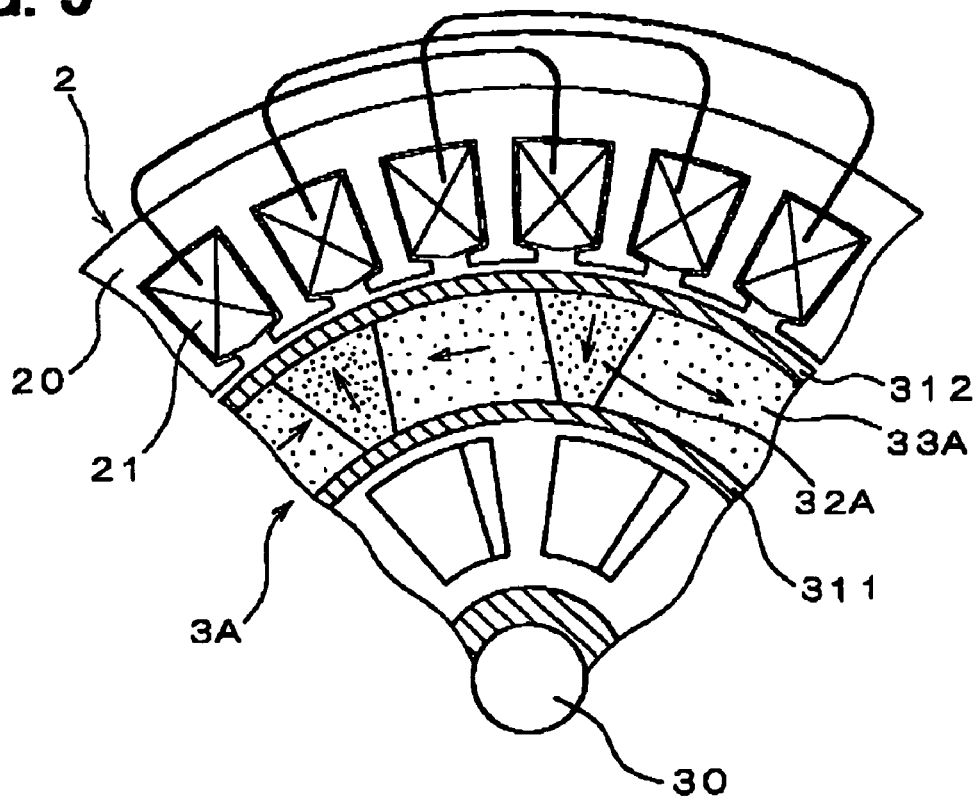
FIG. 5 is a partial enlarged cross-sectional view of a vehicle ac generator according to a second embodiment of the present invention

As shown in FIG. 5, the rotor 3A has main pole magnets 32A and yoke magnets 33A. The shape/size and materials of the main pole magnets 32A and the yoke magnets 33A are different from those of the main pole magnets 32 and the yoke magnets 33 of the first embodiment.

The main pole magnets 32A are formed of rare earth neodymium boron permanent magnets, similar to the first embodiment on the other hand, the yoke magnets 33A is formed of ferrite permanent magnets. In general, the ferrite permanent magnet has a magnetic flux density lower than that of the rare earth neodymium boron permanent magnet. Therefore, the circumferential length and the radial thickness of each of the yoke magnets 33A of the second embodiment are greater than those of the yoke magnet 33 of the first embodiment. Accordingly, a large amount of magnetic flux is allowed to flow in the main pole magnet 32A through the circumferential surfaces. An outside diameter of the yoke magnets 33A is substantially the same as an outside diameter of the main pole magnets 32A. Therefore, flux leakage in the radial outward direction of the yoke magnets 33A can be linked to the stator 2 with the magnetic flux of the main pole magnets 32A.

Third Embodiment

Figure 6:
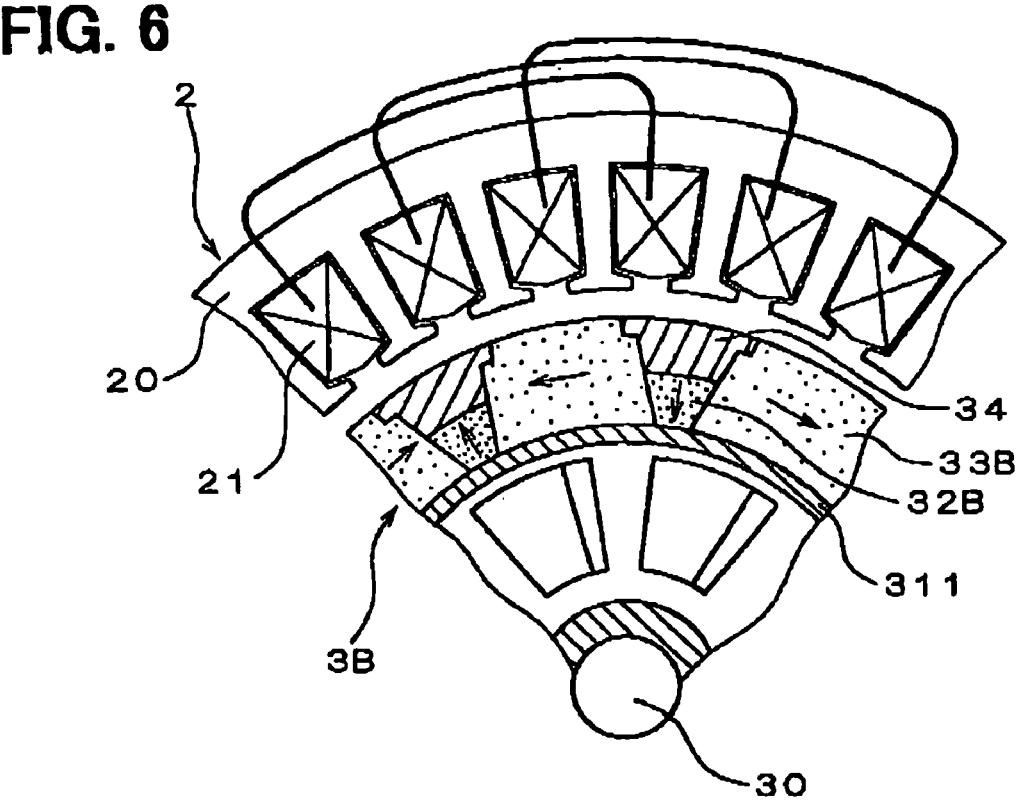
FIG. 6 is a partial enlarged cross-sectional view of a vehicle ac generator according to a third embodiment of the present invention.

In the third embodiment, general structure of a vehicle ac generator is similar to that of the first embodiment shown in FIG. 1. The vehicle ac generator of the third embodiment has a rotor 3B, which has a structure different from that of the rotor 3 of the first embodiment, as shown in FIG. 6. Thus, a description will be mainly made about the rotor 3B.

In the rotor 3B, a predetermined number of main pole magnets 32B and a predetermined number of yoke magnets 33B are arranged alternately in the circumferential direction. Each of the main pole magnets 32B are magnetized in a manner similar to the first embodiment. Also, the yoke magnets 33B are arranged such that the circumferential surfaces of each yoke magnet 33B are opposed to and abut the circumferential surfaces of the adjoining main pole magnets 32B. Here, an outside diameter of the main pole magnets 32B is smaller than the outside diameter of the yoke pole magnets 33B. Further, core pole pieces 34 having high conductivity are arranged in contact with the outer peripheral surfaces of the main pole magnets 32B. Similar to the main pole magnets 32B, the core pole pieces 34 are arranged in contact with the yoke magnets 33B in the circumferential direction. Accordingly, the large amount of magnetic flux is concentrated in the core pole pieces 34, thereby improving power output of the vehicle ac generator. Further, cost performance of the vehicle ac generator is improved and a size of the vehicle ac generator is reduced. Furthermore, the heat of each magnet is effectively released and a reliability to the thermal demagnetization is improved in the rotary electric machine, which rotates under high temperature.

Another Embodiments

Figure 7:
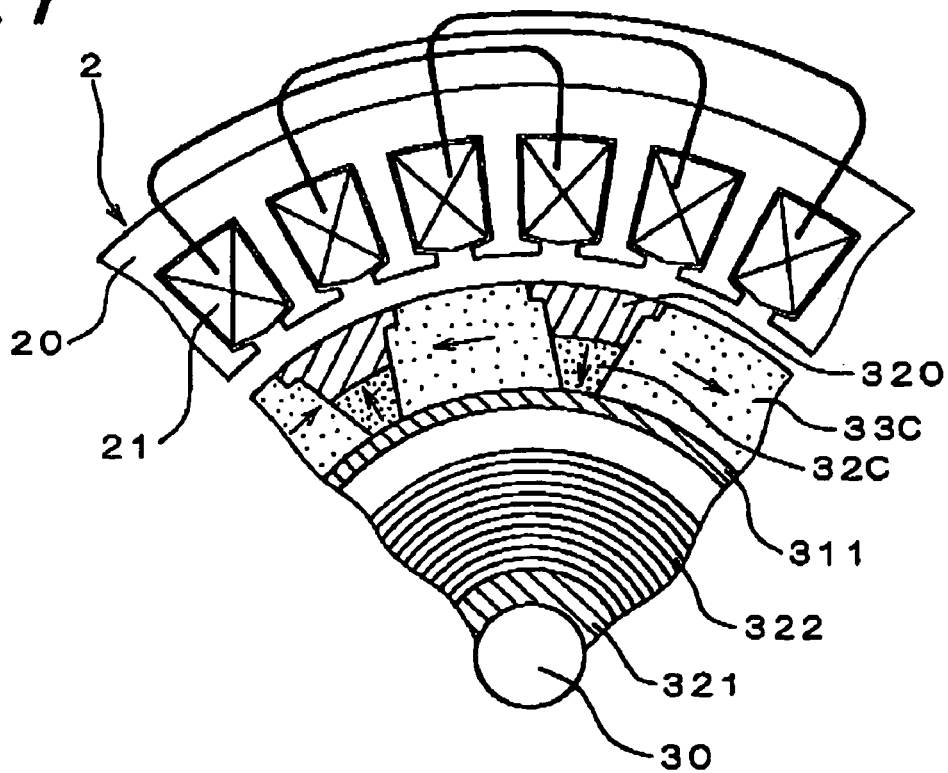
FIG. 7 is a partial enlarged cross-sectional view of a vehicle ac generator according to further another embodiment of the present invention.

In the above embodiments, permanent magnets, such as the main pole magnets 32 and the yoke magnets 33, are used as magnetic fields. However, a filed coil can be employed to the rotor in addition to the permanent magnets. In this case, advantages similar to the above embodiments can be provided. For example, as shown in FIG. 7, a Lundell-type claw pole 320 can be employed. In the Lundell-type claw pole 320, the portion, corresponding to the core pole piece 34 of the third embodiment, extends in the axial direction, further extends in the radial direction toward the rotation axis of the rotation shaft 30, passes around the periphery of the rotation shaft 30 and further extends in the radial direction. Further, a field coil 322 is wound around a core portion 321 provided around the rotation shaft 30. The field coil 322 is used as an excitation source, and also main pole magnets 32C and yoke magnets 33C are used as the excitation source.

In the above embodiments, the present invention is exemplary employed to the vehicle ac generator. However, the present invention can be employed to a generator for another purposes and various kinds of dc machine. For example, the main pole magnets and yoke magnets are arranged in the inner periphery of an aluminum cylindrical member made of light-weight, non-magnetic metal having high heat dispersion. Further, an armature rotor is arranged in the inner periphery of the magnet arrangement. With this arrangement, beat dispersion of the magnets is improved and demagnetization is reduced. Therefore, a compact, high power output dc motor, which withstands excess loads, is provided.

Further, the present invention can be employed to a rotary electric machine, which is located in a closed space or close to an engine generating beat of such as electric vehicles or hybrid vehicles and which is at a under high temperature condition and required to be compact and produce high power output. Also, the present invention can be employed to an ac servomotor for value control processing, which requires low inertia, or for driving trains, which requires to be compact and light-weight.

The present invention is not limited to the above embodiments, but may be implemented in other ways without departing from the spirit of the invention.

What is claimed is:

1. A rotor for a rotary electric machine, comprising:
   a predetermined number of main pole magnets, wherein each of the main pole magnets is magnetized so that its radial inside portion and its radial outside portion have opposite polarity of north pole and south pole from each other, and the main pole magnets are arranged in a circumferential direction so that each main pole magnet has its radial inside and radial outside polarities reversed from its closest main pole magnets;
   a predetermined number of yoke magnets disposed to allow magnetic flux to flow through circumferential surfaces of the main pole magnets; and
   a metal heat radiating member having heat conductivity, wherein the main pole magnets and yoke magnets are fixed in contact with the metal heat radiating member, and the heat radiating member includes a cylindrical portion surrounding outer peripheries of the main pole magnets and yoke magnets.

2. The rotor according to claim 1, further comprising: a rotation shaft on which the heat radiating member is fixed, wherein
   the rotation shaft and the heat radiating member define a hollow space therebetween.

3. The rotor according to claim 1, wherein the metal heat radiating member is made of a nonmagnetic material.

4. The rotor according to claim 1, wherein
the metal heat radiating member includes base portions and heat radiating blade portions in form of blades, and
the base portions and the blade portions are located at axial ends of the main pole magnets and yoke magnets to restrict axial movements of the main pole magnets and the yoke magnets.

5. The rotor according to claim 1, wherein
the main pole magnets, the yoke magnets and the metal heat radiating member are sealed with a fixing agent having heat conductivity higher than that of air.

6. The rotor according to claim 1, wherein the main pole magnets are formed of rare earth magnets and the yoke magnets are formed of ferrite permanent magnets.

7. The rotor according to claim 2, further comprising a support portion for supporting the metal heat radiating member on the shaft by a predetermined clearance therebetween, wherein the support portion is disposed between the metal heat radiating member and the shaft.

8. The rotor according to claim 7, wherein the support portion is a radial extending portion extending in a radial outward direction from a substantially middle portion of the metal heat radiating member.

9. The rotor according to claim 7, wherein the support portion is connected to a middle portion of the metal heat radiating member in an axial direction.

10. The rotor according to claim 7, further comprising a stator accommodated in a frame, wherein the shaft is capable of being rotated to produce a rotating magnetic field linking to the stator,
the shaft is rotatably supported to the frame through a pair of bearings, and
a part of each bearing in an axial direction faces an inner circumferential surface of the metal heat radiating member.

11. The rotor according to claim 9, wherein the support portion includes an air hole communicating with a hollow space, and
the hollow space is disposed between an inner circumferential surface of the metal heat radiating member and the shaft.

12. The rotor according to claim 9, wherein the support portion includes a pair of cylinders extending from both sides of the support portion in an axial direction, and
the cylinders are connected of the shaft.

13. The rotor according to claim 10, wherein the metal heat radiating member further includes a blade, which is disposed on both ends of the metal heat radiating member in an axial direction, and
the blade faces a stator coil of the stator.

14. The rotor according to claim 12, wherein
the stator coil is accommodated in the frame,
the bearings are disposed on the shaft so that the shaft is rotatably supported on the frame, and
the bearings are disposed on an inside of the blade of the metal heat radiating member.

* * * * *